(12) United States Patent
Shimizu

(10) Patent No.: US 9,273,766 B2
(45) Date of Patent: Mar. 1, 2016

(54) ELECTRIC ACTUATOR

(71) Applicant: Tatsunori Shimizu, Iwata (JP)

(72) Inventor: Tatsunori Shimizu, Iwata (JP)

(73) Assignee: NTN Corporation, Osaka-shi (JP)

( * ) Notice: Subject to any disclaimer, the term of this patent is extended or adjusted under 35 U.S.C. 154(b) by 479 days.

(21) Appl. No.: 13/726,045

(22) Filed: Dec. 22, 2012

(65) Prior Publication Data

US 2013/0112022 A1 May 9, 2013

Related U.S. Application Data

(63) Continuation of application No. PCT/JP2011/064518, filed on Jun. 24, 2011.

(30) Foreign Application Priority Data

Jun. 25, 2010 (JP) ................. 2010-144761

(51) Int. Cl.
*F16H 25/12* (2006.01)
*F16H 25/20* (2006.01)
*H02K 7/06* (2006.01)
*F16H 25/22* (2006.01)
*H02K 11/00* (2006.01)

(52) U.S. Cl.
CPC ............... *F16H 25/12* (2013.01); *F16H 25/20* (2013.01); *H02K 7/06* (2013.01); *F16H 25/2204* (2013.01); *F16H 2025/204* (2013.01); *F16H 2025/2031* (2013.01); *F16H 2025/2081* (2013.01); *H02K 11/0021* (2013.01); *Y10T 74/18664* (2015.01)

(58) Field of Classification Search
CPC .................. F16H 2025/2081; F16H 2025/204; F16H 2025/2031
See application file for complete search history.

(56) References Cited

U.S. PATENT DOCUMENTS

| 2,504,018 | A | * | 4/1950 | Gibson et al. ................ 192/48.1 |
| 5,127,281 | A | * | 7/1992 | Yanawgisawa .............. 74/89.28 |
| 5,784,922 | A | | 7/1998 | Ozaki et al. |
| 6,101,889 | A | * | 8/2000 | Laskey ......................... 74/89.23 |

FOREIGN PATENT DOCUMENTS

| JP | 02-186157 | 7/1990 |
| JP | 08-049782 | 2/1996 |
| JP | 2005-163922 | 6/2005 |
| JP | 2005-325956 | 11/2005 |
| JP | 2008-232338 | 10/2008 |
| JP | 2010-031965 | 2/2010 |

* cited by examiner

*Primary Examiner* — Terence Boes
(74) *Attorney, Agent, or Firm* — Harness, Dickey & Pierce, P.L.C.

(57) ABSTRACT

An electric actuator has a housing with an electric motor mounted on the housing (2). A ball screw mechanism converts rotational motion of the electric motor to an axial linear motion of a drive shaft. A side-cover (13) is detachably mounted to the housing (2). A guide member (14) is mounted on the inner wall of the side-cover (13). The guide member (14) has a substantially "C"-shaped cross-section and includes a recessed groove (14a) axially extending opposite to the drive shaft (7). A rotation-preventing pin (9), mounted on the outer circumference of the threaded screw shaft (15), engages with the guide member (14) to support the threaded screw shaft (15) so that it can be axially moved relative to the housing (2) but cannot be rotated.

10 Claims, 5 Drawing Sheets

ELECTRIC ACTUATOR

CROSS-REFERENCE TO RELATED APPLICATIONS

This application is a continuation of International Application No. PCT/JP2011/064518, filed Jun. 24, 2011, which claims priority to Japanese Application No. 2010-144761, filed Jun. 25, 2010. The disclosures of the above applications are incorporating herein by reference.

FIELD

The present disclosure relates to an electric actuator provided with a ball screw mechanism used in motors in general industries and driving sections of automobiles etc. and, more particularly, to an electric actuator used in a transmission or a parking brake of an automobile to convert a rotary motion from an electric motor to a linear motion of a drive shaft via the ball screw mechanism.

BACKGROUND

Generally, gear mechanisms, such as a trapezoidal thread worm gear mechanism, or a rack and pinion gear mechanism are used as the mechanism to convert rotary motion of an electric motor to an axial linear motion in an electric actuator used in various types of driving sections. These motion converting mechanisms involve sliding contact portions and thus power loss. Accordingly, they are obliged to increase the size of the electric motors and power consumption. Accordingly, the ball screw mechanisms have been widely adopted as more efficient actuators.

In general, in electric actuators with a ball screw mechanism where a nut is contained in a housing of the electric actuator, it is necessary to provide a groove to prevent rotation of the nut. Alternatively, the inner circumference of the housing includes a profiled configuration (non cylindrical configuration) in order to prevent rotation of the nut. However, since it is difficult to machine an elongate housing with the groove or profiled configuration, the whole length of the housing should be limited. Thus, it is impossible to obtain a long stroke of the actuator. The groove or profiled configuration may be formed by a method other than machining such as by a molding method using dies. However, the molding method is complicated and leads to an increase of the manufacturing cost. In addition, the nut should have a projection to engage the groove if the groove is formed on the inner circumference of the housing. Thus, this also increases the manufacturing cost of the nut. Furthermore, both the inner circumference of the housing and the nut has complicated configurations and thus increase the configuration of the actuator.

To solve these problems, an electric actuator is known and shown in FIG. 6. The electric actuator has a housing 51, a threaded screw shaft 56, a nut 51, a plurality of balls 57 and a guide member 63. The threaded screw shaft 56 is formed with an external thread 56a. The nut 53 is formed with an internal thread 53a on its inner circumference to engage the threaded screw shaft 56 so as to be axially moved. The plurality of balls 57 are rollably arranged along a rolling passage formed between the opposite threads 56a and 53a. The guide member 63 includes a guiding portion 63a, extending along the inner circumference of the housing 51, and an engaging portion 63b, engaging the housing 51.

The housing 51 has a main body 51a with a substantially hollow configuration. A cup-shaped cover member 51b is secured to the main body 51 to close the end of the main body 51a. A cylindrical output shaft 52, forming a driven member, and a nut 53, connected to the output shaft 52, are contained in the main body 51a. They have a cylindrical inner circumference. The left-hand end of the output shaft 52 projects from the main body 51a of the housing 51. The right-hand end of the output shaft 52 is formed with a blind bore 52a. The outer circumference of the output shaft 52 is slidably supported relative to the main body 51a by a bushing 54. A sealing member 55, arranged adjacent to the bushing 54, seals a gap between the output shaft 52 and the main body 51a to prevent entry of dust from the outside.

The threaded screw shaft 56 passes through the nut 53 and extends freely movably into the blind bore 52a of the output shaft 52. The nut 53 is arranged around the threaded screw shaft 56. The nut 53 has an axially extending groove 53b at the bottom of its outer circumference. Also, the nut 53 includes a tube-type ball circulating member. The ball screw mechanism is formed by the nut 53, the threaded screw shaft 56, balls 57 and the guide member 63.

The threaded screw shaft 56 is rotationally supported by a ball bearing 59 arranged at the end of the main body 51a, via a bearing spacer 58. An outer ring of the ball bearing 59 is secured on the bearing spacer 58 by a securing member 60. An inner ring of the ball bearing 59 is secured on the threaded screw shaft 56 by a securing ring 61. Accordingly, the threaded screw shaft 56 is supported so that it is only able to rotate and not able to move axially. A gear 62 is integrally connected to the right-end of the threaded screw shaft 56 via a serration connection.

The guide member 63 is press-formed from a metal sheet. The guide member 63 has the straight guiding portion 63a and the engaging portion 63b. The straight guiding portion 63a is adapted to engage the groove 53b of the nut 53. The engaging portion 63b is bent perpendicularly to the guiding portion 63a. In addition, the right-hand end of the main body 51a of the housing 51 is formed with a recessed groove 51c to receive the engaging portion 63b. The engaging portion 63b has substantially the same width as that of the recessed groove 51c that it engages (see FIG. 7). The surface of the guiding portion 63a is coated by manganese phosphate salt or zinc phosphate.

When an operator turns the switch "ON", a motor (not shown) is actuated and rotational power is transmitted to the nut 53. Accordingly, the threaded screw shaft 56 is rotated. The nut 53 is smoothly guided only in the axial direction by the guide member 63. The guide member 63 exhibits the rotation-preventing function. The rotational motion of the threaded screw shaft 56 can be efficiently converted to linear motion of the nut 53. Thus, the output shaft 52 to which the nut 53 is connected can be moved in the axial direction.

The electric actuator can be assembled first by inserting the guide member 63 into the main body 51a of the housing 51. The bushing 54 is assembled from the right-hand end of the main body 51a. The bent engaging portion 63b then engages the recessed portion 51c of the main body 51a. Such a structure enables easy mounting the guide member 63 to the main body 51a without using any special tool. The nut 53 and the output shaft 52 can be inserted into the main body 51a by engaging the guiding portion 63a via the groove 53b. The other parts, such as the threaded screw shaft 56, ball bearing 59 etc. can be orderly assembled.

The tip end of the guiding portion 63a engages a notch 54a of the bushing 54. Thus, both ends of the guide member 63 are firmly secured to the main body 51a. Accordingly, torsion of the guide member 63 can be effectively prevented even though the guiding portion 63a is long. Thus, the rotation-preventing function of the guide member 63 can be effectively exhibited (see, Japanese Laid-open Patent Publication No. 232338/2008).

According to the prior art electric actuator, the rotation-preventing function can be achieved by engaging the guiding portion 63a with the groove 53b formed on the outer circumference of the nut 53 and by engaging the tip end of the guiding portion 63a with the notch 54a of the bushing 54. This increases the number of parts, assembling steps and the degree of complication. Also, it requires surface properties, such as hardness, surface roughness etc., to be sufficient to stand the sliding motion between the output shaft 52, nut 53 and guiding portion 63a. Accordingly, this increases the manufacturing cost of the electric actuator.

SUMMARY

It is, therefore, an object of the present disclosure to provide an electric actuator that can reduce the number of parts and the manufacturing cost. Also, it improves the reliability of the electric actuator by simplifying the rotation-preventing mechanism.

To achieve the object of the present disclosure, an electric actuator is provided that comprises a cylindrical housing. An electric motor is mounted on the housing. A speed reduction mechanism transmits the rotational power of the electric motor to a ball screw mechanism, via a motor shaft. The ball screw mechanism is adapted to convert the rotational motion of the electric motor, transmitted via the speed reduction mechanism, to an axial linear motion of a drive shaft. The ball screw mechanism includes a nut connected to the speed reduction mechanism. It is supported so that it can be rotated relative to the housing via a rolling bearing mounted on the housing. However, it cannot be axially moved. A threaded screw shaft is inserted in the nut via a large number of balls. The threaded screw shaft is coaxially integrated with the drive shaft. The housing is formed with a cylindrical blind bore to contain the drive shaft in the cylindrical blind bore. A side-cover can be detachably mounted on the housing. A guide member is mounted on the inner wall of the side-cover. The guide member has a substantially "C"-shaped cross-section and is formed with a recessed groove extending axially opposite to the drive shaft. A rotation-preventing pin, mounted on the outer circumference of the threaded screw shaft, engages the guide member so as to support the threaded screw shaft so that it can be axially moved relative to the housing but it cannot be rotated.

The speed reduction mechanism transmits the rotational power of the electric motor to a ball screw mechanism, via a motor shaft. The ball screw mechanism is adapted to convert the rotational motion of the electric motor, transmitted via the speed reduction mechanism, to an axial linear motion of a drive shaft. The ball screw mechanism includes a nut connected to the speed reduction mechanism. The nut is supported so that it can be rotated relative to the housing via a rolling bearing mounted on the housing but it cannot be axially moved. A threaded screw shaft, inserted into the nut via a large number of balls, is coaxially integrated with the drive shaft. The housing is formed with a cylindrical blind bore to contain the drive shaft in the cylindrical blind bore. A side-cover is detachably mounted to the housing. A guide member is mounted on the inner wall of the side-cover. The guide member has a substantially "C"-shaped cross-section and is formed with a recessed groove extending axially opposite to the drive shaft. A rotation-preventing pin, mounted on the outer circumference of the threaded screw shaft, engages the guide member to support the threaded screw shaft so that it can be axially moved relative to the housing but it cannot be rotated. Thus, it is possible to provide an electric actuator that can reduce the number of parts and the manufacturing cost. Also, it improves the reliability of the electric actuator by simplifying the rotation-preventing mechanism.

A sensor pin is rotationally mounted on the housing. A sensor link is secured on the sensor pin. The sensor pin engages the rotation-preventing pin. A magnet is mounted on the end of the sensor pin. A sensor is arranged opposite to the magnet via a predetermined air gap. This makes it possible to directly detect the position of the drive shaft at any position within a linear motion range of the drive shaft by measuring the detected angle of the sensor pin using the sensor.

The sensor is a non-contact type semiconductor sensor. This makes it possible to detect the absolute angle by a vibration proof integrated circuit of the magnetic sensor and signal processing circuit. Thus, the sensor obtains a stable detecting accuracy for a long term even when a vehicle is subjected to severe vibration under actual running condition.

The sensor link is formed with a longitudinal slit in which the rotation-preventing pin is engaged. This makes it possible to prevent rotation of the drive shaft and achieve a pendulum motion not obstructing the axial movement of the drive shaft.

A needle roller, used in a needle bearing, is used as the rotation-preventing pin. The needle roller used in a needle bearing is formed from high carbon chrome steel and hardened to its core by dip quenching to have a hardness of 58-64 HRC. Thus, it is possible to maintain high accuracy and anti-friction property for a long term.

The axial position of the rotation-preventing pin and accordingly the stroke of the drive shaft can be limited by the recessed groove of the guide member. This makes it possible to simplify the rotation-preventing mechanism.

The guide member is press-formed from a carbon steel sheet. It is hardened by high frequency induction hardening to have a surface hardness of 40-50 HRC. This makes it possible to improve the anti-friction property and to suppress wear of the guide member for a long term.

The guide member is formed from cemented steel sheet. It is hardened by carburizing to have a surface hardness of 40-50 HRC.

A lubricating coating is formed on the surface of the recessed groove of the guide member. This improves the slidability of the guide member and achieves a smoothly and firmly operable rotation-preventing mechanism.

The guide member is formed by injection molding from thermoplastic resin filled with fiber reinforcement. This makes it possible to improve both the slidability and anti-friction property for a long term.

The electric actuator of the present disclosure comprises a cylindrical housing. An electric motor is mounted on the housing. A speed reduction mechanism transmits the rotational power of the electric motor to a ball screw mechanism, via a motor shaft. The ball screw mechanism is adapted to convert the rotational motion of the electric motor, transmitted via the speed reduction mechanism, to an axial linear motion of a drive shaft. The ball screw mechanism includes a nut connected to the speed reduction mechanism. It is supported so that it can be rotated relative to the housing via a rolling bearing mounted on the housing but it cannot be moved axially. A threaded screw shaft, inserted in the nut via a large number of balls, is coaxially integrated with the drive shaft. The housing is formed with a cylindrical blind bore to contain the drive shaft in the cylindrical blind bore. A side-cover can be detachably mounted to the housing. A guide member is mounted on the inner wall of the side-cover. The guide member has a substantially "C"-shaped cross-section and is formed with a recessed groove extending axially opposite to the drive shaft. A rotation-preventing pin, mounted on the outer circumference of the threaded screw shaft, engages the guide member to support the threaded screw shaft so that it can be axially moved relative to the housing but cannot be rotated. Thus, it is possible to provide an electric actuator that can reduce the number of parts and the manufacturing cost. Also, it improves the reliability of the electric actuator by simplifying the rotation-preventing mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

An electric actuator comprises a cylindrical housing. An electric motor is mounted on the housing. A speed reduction mechanism transmits the rotational power of the electric motor to a ball screw mechanism via a motor shaft. The ball screw mechanism is adapted to convert the rotational motion of the electric motor, transmitted via the speed reduction mechanism, to an axial linear motion of a drive shaft. The ball screw mechanism includes a nut connected to the speed reduction mechanism. The nut is supported so that it can be rotated relative to the housing, via a rolling bearing mounted on the housing, but cannot be moved axially. A threaded screw shaft, inserted in the nut via a large number of balls, is coaxially integrated with the drive shaft. The housing is formed with a cylindrical blind bore to contain the drive shaft in the cylindrical blind bore. A side-cover is detachably mounted to the housing. A guide member is mounted on the inner wall of the side-cover. The guide member has a substantially "C" shaped cross-section and is formed with a recessed groove extending axially opposite to the drive shaft. A rotation-preventing pin, mounted on the outer circumference of the threaded screw shaft, engages the guide member to support the threaded screw shaft so that it can be axially moved relative to the housing but it cannot be rotated.

A preferable embodiment of the present disclosure will be hereinafter described with reference to the drawings.

Figure 1:
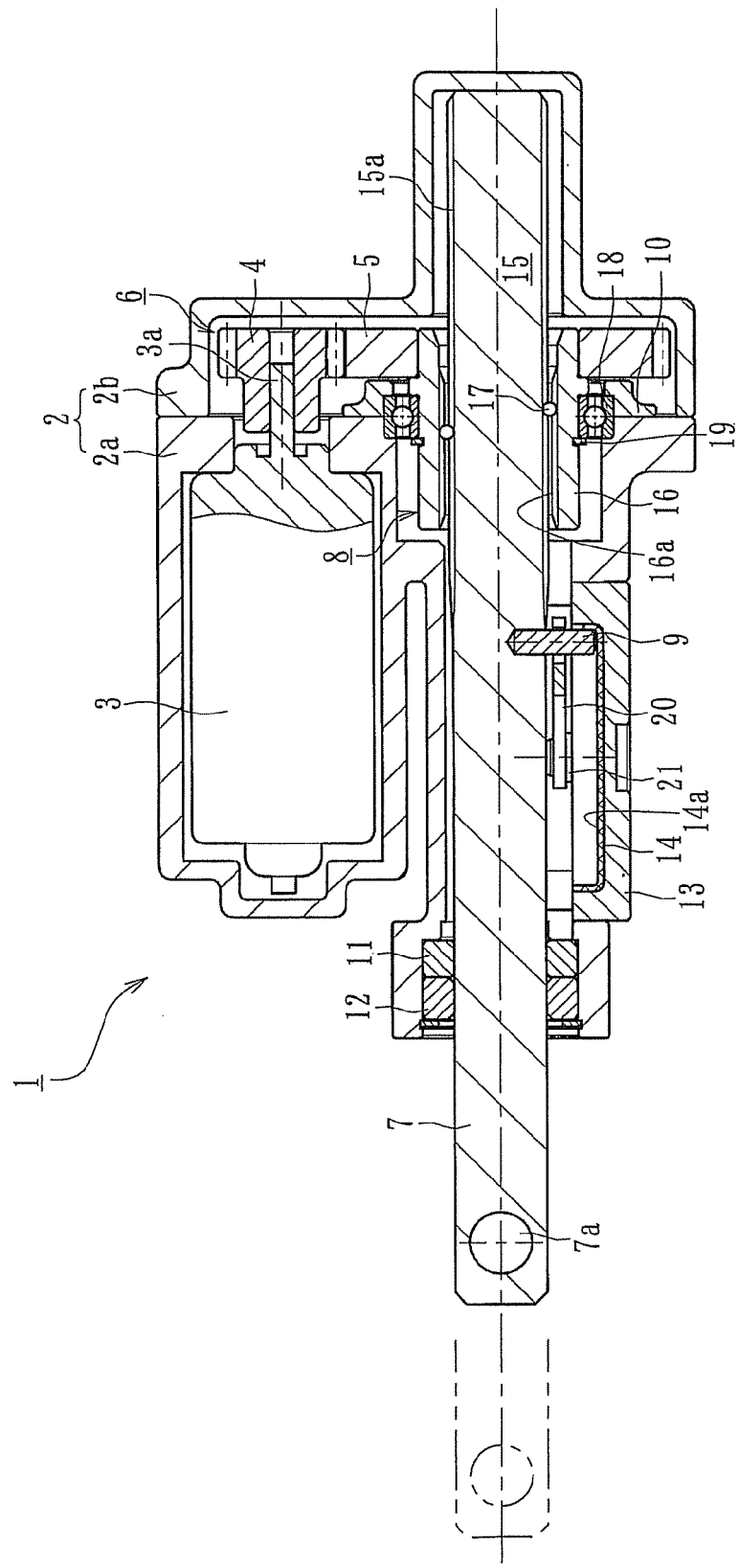
FIG. 1 is a longitudinal section view of an electric actuator.
Figure 2:
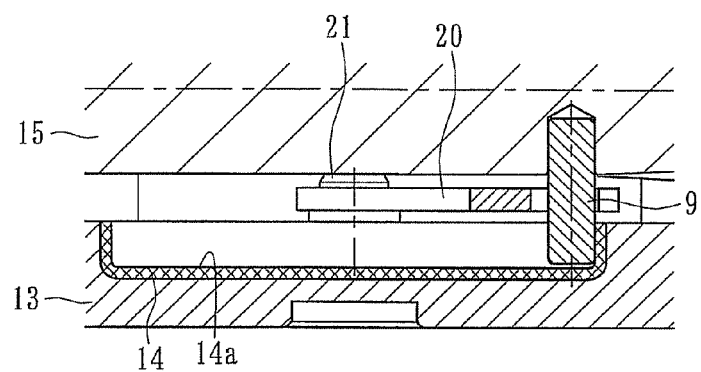
FIG. 2 is a partially enlarged view of a rotation-preventing portion of FIG. 1.
Figure 3:
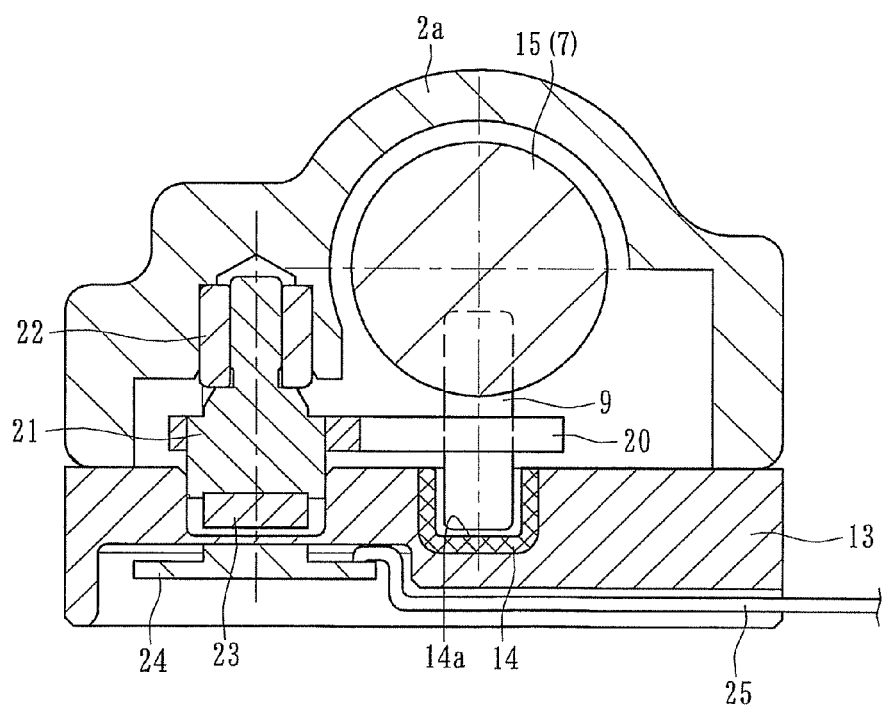
FIG. 3 is a cross-section view of the rotation-preventing portion of FIG. 1.
Figure 4:
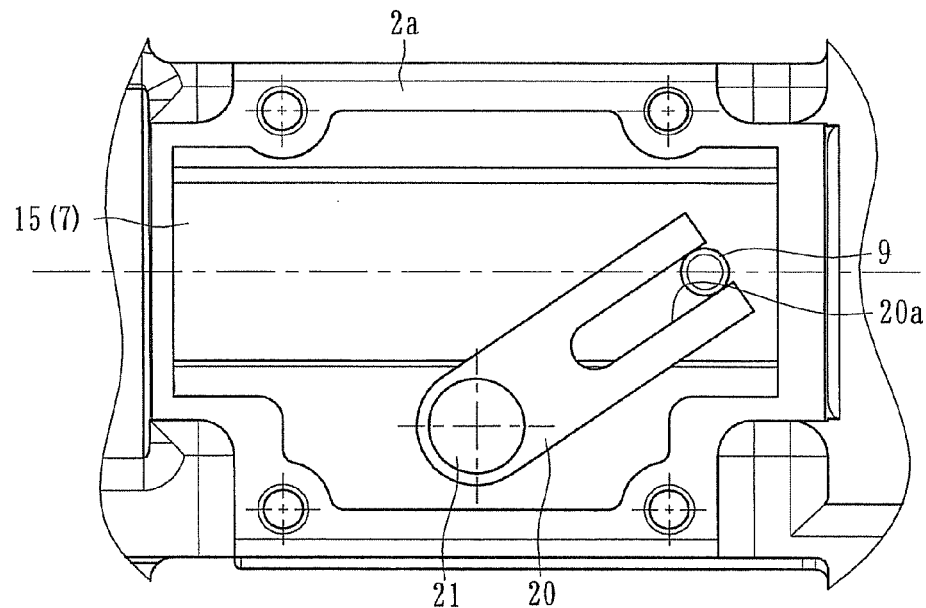
FIG. 4 is a side elevation view of the rotation-preventing portion of FIG. 1.
Figure 5:
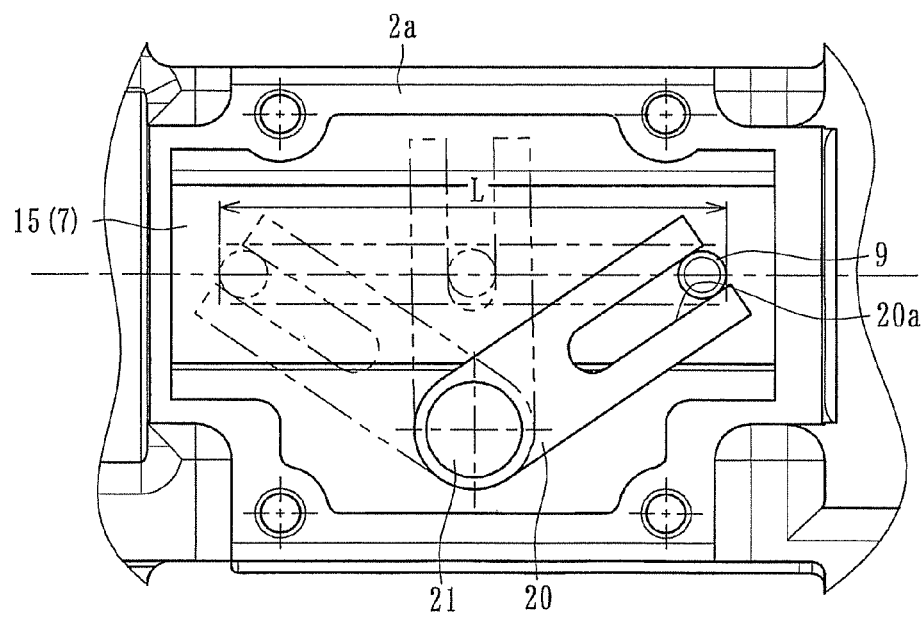
FIG. 5 is an explanatory view of the operation of the rotation-preventing portion of FIG. 4.
Figure 6:
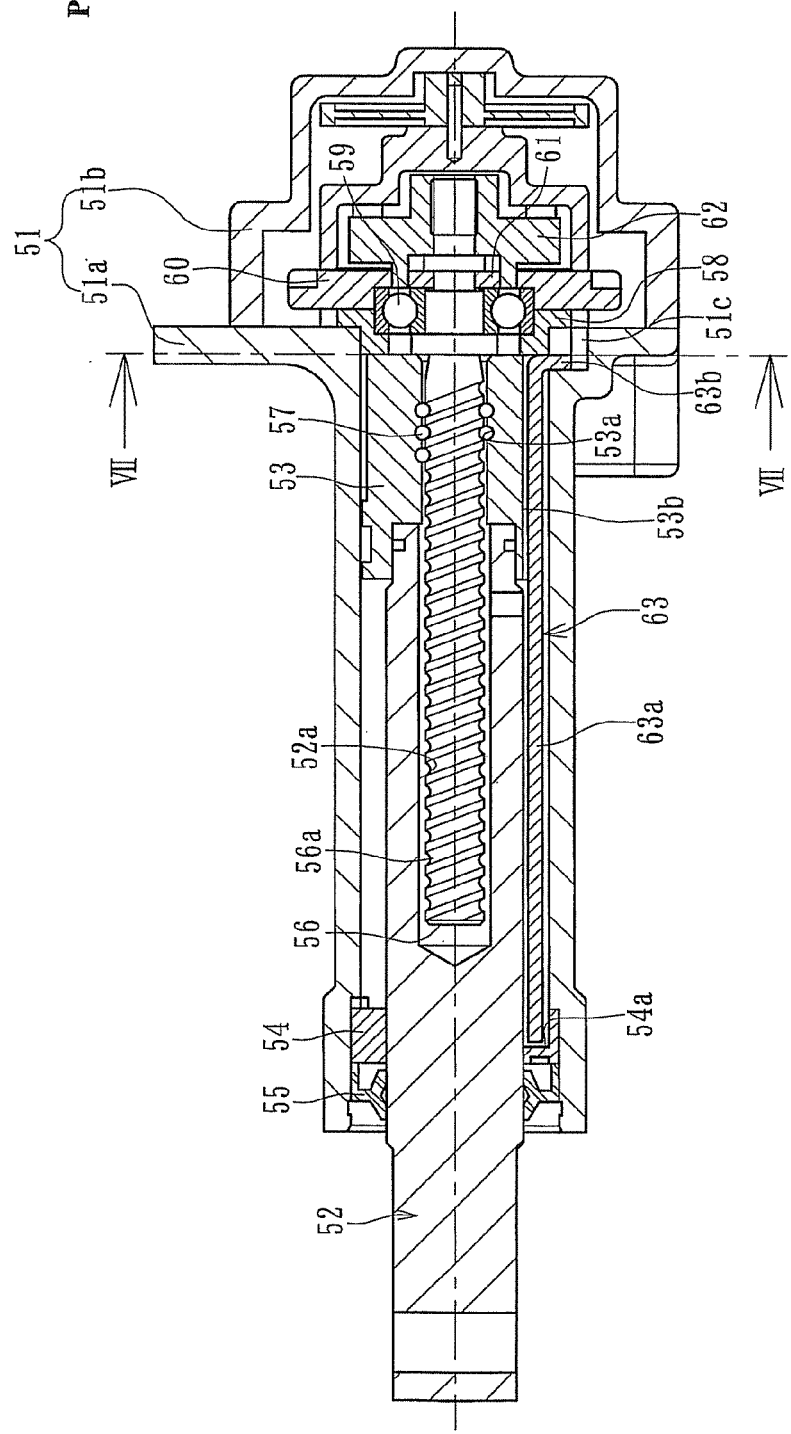
FIG. 6 is a longitudinal section view of a prior art electric actuator.
Figure 7:
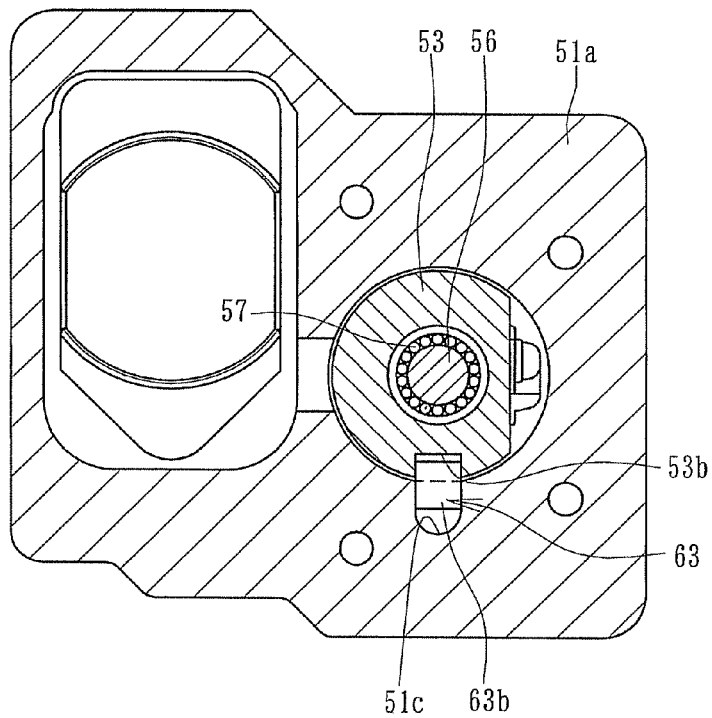
FIG. 7 is a cross-section view taken along line VII-VII in FIG. 6.

FIG. 1 is a longitudinal section view of the electric actuator. FIG. 2 is a partially enlarged view of a rotation-preventing portion of FIG. 1. FIG. 3 is a cross-section view of the rotation-preventing portion of FIG. 1. FIG. 4 is a side elevation view of the rotation-preventing portion of FIG. 1. FIG. 5 is an explanatory view of the operation of the rotation-preventing portion of FIG. 4.

The electric actuator 1 includes a cylindrical housing 2, an electric motor 3 mounted on the housing 2, a speed reduction mechanism 6, a ball screw mechanism 8 and a rotation-preventing pin 9. The speed reduction mechanism includes a pair of spur gear 4, 5 to transmit the rotational power of the electric motor 3 to the ball screw mechanism 8 via a motor shaft 3a. The ball screw mechanism 8 is adapted to convert the rotational motion of the electric motor 3, transmitted via the speed reduction mechanism 6, to an axial linear motion of a drive shaft. The rotation-preventing pin 9 prevents the rotation of the drive shaft 7.

The housing 2 includes a first housing 2a and a second housing 2b attached to the end of the first housing 2a. The electric motor 3 is arranged within the first housing 2a. An outer ring of a ball bearing 18, mounted on the outer circumference of a nut 16, is mounted to be sandwiched between the first housing 2a and a bearing bracket 10.

A smaller spur gear 4 is press-fit onto the end of the motor shaft 3a of the electric motor 3. The spur gear 4 is incapable of relative rotation with respect to the motor shaft 3. The larger spur gear 5 is secured to the nut 16, which forms the ball screw mechanism 8, and mates with the smaller spur gear 4.

The ball screw mechanism 8 includes a threaded screw shaft 15. The shaft 15 is formed with a helical threaded groove 15a on its outer circumference. The nut 16 is formed with a helical thread on its inner circumference. The helical thread groove 16a opposes the helical thread groove 15a of the threaded screw shaft 15. A large number of balls 17 are rollably contained in a helical passage formed by the thread grooves 15a, 16a. The larger spur gear 5 is press-fit onto the outer circumference of the nut 16. The ball bearing 18 is fit onto both the first housing 2a and the bearing bracket 10. Also, it is fit onto the outer circumference of the nut 16. A stopper ring 19 positions the nut 16 with the bearing 18 so as to be rotatable but not axially movable.

The cross-sectional configuration of each the thread groove 15a, 16a may be either one of a circular-arc or a Gothic-arc configuration. However this embodiment adopts the Gothic-arc configuration. The Gothic-arc configuration has a large contacting angle with the ball 17 and a small axial gap. This provides a large rigidity against the axial load and suppresses the generation of vibration.

The drive shaft 7 is integrally formed with the threaded screw shaft 15, which forms the ball screw mechanism 8. The drive shaft 7 has an aperture 7a at the left-hand end of the drive shaft 7 to connect it to any link member (not shown). The first housing 2a is formed with a cylindrical blind bore to contain the drive shaft 7. The outer circumference of the drive shaft 7 is slidably supported relative to the first housing 2a via a bushing 11. A sealing member 12 is arranged adjacent to the bushing 11 to seal a gap between the drive shaft 7 and the first housing 2a to prevent entry of dust etc. from the outside.

The rotation-preventing pin 9 is mounted on the threaded screw shaft 15 at its left-hand end. A side cover 13 is detachably mounted on the first housing 2a. A guide member 14 is mounted on the inner wall of the side-cover 13. The guide member 14 has a substantially "C" shaped cross-section. The guide member 14 is formed with a recessed groove 14a axially extending opposite to the threaded screw shaft 15 (or drive shaft 7). In addition, the rotation-preventing pin 9 engages the recessed groove 14a of the guide member 14.

As shown in the enlarged view of FIG. 2, the rotation-preventing pin 9 engages with a sensor link 20. Thus, the axial position of the rotation-preventing pin 9 and accordingly the stroke of the drive shaft 7 can be limited by the recessed groove 14a of the guide member 14. The rotation-preventing pin 9 is formed by a needle roller used in a needle bearing. That is, the rotation-preventing pin 9 is formed from high carbon chrome steel such as SUJ2 etc. It is hardened to its core by dip quenching to have a surface hardness of 58-64 HRC. Accordingly, it is possible to maintain high accuracy and anti-friction property for a long term. On the other hand, the guide member 14 is press-formed from cold rolled steel sheet (JIS SPCC etc.) or carbon steel sheet such as S45C etc. It is hardened by high frequency induction hardening to have a surface hardness of 40-50 HRC. This makes it possible to improve the anti-friction property and thus to suppress wear of the guide member 14 for a long term even though the rotation-preventing pin 9 slides on it.

In addition, a lubricating coating is formed on the surface of the recessed groove 14a of the guide member 14. Examples of the lubricating coatings are shown as TiC, TiCN, WC, DLC (Diamond Like Carbon) etc. As the name suggests, DLC is a carbon material having natures similar to diamond. It is formed by an amorphous film having regularly arranged carbon atoms. Fluorocarbon resin may be used as the lubricating coating other than the previously mentioned examples. The formation of lubricating coating improves the slidability of the guide member and achieves a smooth and firm operable rotation-preventing mechanism.

The guide member 14 may be formed of cemented steel such as SCr420, SCM415 etc. It contains a relatively small amount of carbon other than the exemplified carbon steels. It is hardened by carburizing and hardening to improve the anti-friction property. In addition, the guide member 14 may be formed of thermoplastic resin such as PA (polyamide) filled with fiber reinforcement such as GF (glass fiber) of 10-40% by weight by injection molding. This makes it possible to improve both the slidability and anti-friction property for a long term. In such a case, the fill of GF less than 10% by weight cannot exhibit its reinforcing effect. On the other hand, the fill of GF exceeding 40% by weight would detract the dimensional stability due to generation of anisotropy of fibers in a molded article. This would detract from the toughness of the guide member 14 and thus cause breakage of the guide member 14 due to collision of the rotation-preventing pin 9. Examples of the fibrous reinforcements are CF (carbon fiber), aramid fiber, boron fiber etc. other than GF.

The guide member 14 may be formed, other than PA, of thermoplastic resin such as engineering plastics such as PPA (polyphthal amide), PBT (polybutylene terephthalate) etc., thermoplastic resin called super-engineering plastics such as PPS (polyphenylene sulfide), PEEK (poly ether ether ketone), PAI (polyamide imide) etc., or thermosetting resin such as PF (phenol resin), EP (epoxy resin), PI (poly imide resin) etc.

A sensor pin 21 is rotationally mounted on the first housing 2a via bushing 22. A magnet 23 is mounted on the end of the sensor pin 21. In addition, a sensor 24 is arranged opposite to the magnet 23 via a predetermined air gap. More particularly, the sensor 24 is arranged so that its center is aligned with that of the magnet 23. Harnesses 25 for electric power and output signals for the sensor 24 are adapted to be connected to a control apparatus (not shown) set at the outside. It is preferable that the output from the sensor 24 is selectively adaptable to both digital and analogue signals in accordance with a system used.

Although it may be possible to adopt a non-contact type Hall IC as the sensor 24, the sensor 24 of this embodiment is formed by a semiconductor sensor in which a magnetic sensor and a signal processing circuit are integrated to detect the absolute angle. The Hall IC function is incorporated as a semiconductor circuit pattern. This makes it possible to keep the stable detecting accuracy for a long term. This improves the reliability of the sensor even though vibration etc. would be caused under severe running conditions of the vehicle.

The operation of the electric actuator of the present disclosure will be described using FIG. 1. When the electric motor 3 is actuated, its rotation power is transmitted to the nut 16 of the ball screw mechanism 8 via the speed reduction mechanism 6. The threaded screw shaft 15 is linearly driven in the axial direction. This linear motion of the threaded screw shaft 15 is imparted to the linear motion of the drive shaft 7 which is integrally and coaxially formed with the threaded screw shaft 7. The sensor link 20 is swung in accordance with the linear motion of the drive shaft 7. The sensor link 20 limits the range of the linear motion of the drive shaft 7. During motion, the sensor pin 21 rotates within a predetermined range of detected angle. That is, the position of the drive shaft 7 can be directly detected by measuring the detected angle using the sensor 24 at an arbitral position within the range of linear motion of the drive shaft 7.

As shown in FIGS. 4 and 5, the sensor link 20 is secured on the sensor pin 21 to form a pendulum mechanism. The sensor link 20 is formed with a longitudinal slit 20a. The rotation-preventing pin 9 is engaged in the slit 20a to perform the pendulum motion. This prevents the rotation of the drive shaft 7 as well as not to prevent the axial motion of the drive shaft 7. That is, as shown in FIG. 5, the rotation-preventing pin 9 is engaged with the slit 20a of the sensor link 20. This permits the pendulum motion of the sensor link 20 with the engaging position of the rotation-preventing pin 9 being continuously changed in accordance with the swing angle of the sensor link 20. Thus, the drive shaft 7 is allowed to perform the axial motion within a predetermined and desired range of stroke "L". According to the present disclosure, the position of the drive shaft 7 can be directly detected by measuring the swing angle of the sensor link 20 using the sensor 24. The stroke of the drive shaft 7 can be limited by engaging the sensor link 20 with the rotation-preventing pin 9 mounted on the drive shaft 7. The axial position of the rotation-preventing pin 9 is limited by the guide member 14. This makes it possible to provide an electric actuator that can effectively use the space of its housing, reduce the number of parts and thus manufacturing cost, and improve the reliability of the electric actuator by simplifying the rotation-preventing mechanism.

The electric actuator of the present disclosure can be applied to electric actuators used in an electric motor for general industries and driving sections of an automobile etc. that have a ball screw mechanism to convert the rotational input from an electric motor to the linear motion of a drive shaft.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. An electric actuator comprising:
   a housing;
   an electric motor mounted on the housing; and
   a speed reduction mechanism for transmitting the rotational power of the electric motor to a ball screw mechanism, via a motor shaft, the ball screw mechanism adapted to convert the rotational motion of the electric motor, transmitted via the speed reduction mechanism, into an axial linear motion of a drive shaft;

the ball screw mechanism includes a nut connected to the speed reduction mechanism and supported so that it can be rotated relative to the housing via a rolling bearing mounted on the housing but cannot be axially moved, a threaded screw shaft, inserted in the nut via a large number of balls, is coaxially integrated with the drive shaft;

the housing is formed with a cylindrical blind bore to contain the drive shaft in the cylindrical blind bore, a side-cover is detachably mounted to the housing;

a guide member is mounted on the inner wall of the side-cover, the guide member has a substantially "C"-shaped cross-section and is formed with a recessed groove axially extending opposite to the drive shaft; and a rotation-preventing pin, mounted on the outer circumference of the threaded screw shaft is engaged, with the guide member so as to support the threaded screw shaft so that it can be axially moved relative to the housing but cannot be rotated.

2. The electric actuator of claim 1, wherein a sensor pin is rotationally mounted on the housing and a sensor link, secured on the sensor pin, engages with the rotation-preventing pin, and a magnet is mounted on the end of the sensor pin and a sensor is arranged opposite to the magnet via a predetermined air gap.

3. The electric actuator of claim 2, wherein the sensor is a non-contact type semiconductor sensor.

4. The electric actuator of claim 2, wherein the sensor link is formed with a longitudinal slit which engages with the rotation-preventing pin.

5. The electric actuator of claim 1, wherein a needle from a needle bearing is used as the rotation-preventing pin.

6. The electric actuator of claim 1, wherein the axial position of the rotation-preventing pin and accordingly the stroke of the drive shaft can be limited by the recessed groove of the guide member.

7. The electric actuator of claim 1, wherein the guide member is press-formed from carbon steel sheet and hardened by high frequency induction hardening to have a surface hardness of 40-50 HRC.

8. The electric actuator of claim 1, wherein the guide member is formed of cemented steel sheet and hardened by carburizing and hardening to have a surface hardness of 40-50 HRC.

9. The electric actuator of claim 1, wherein a lubricating coating is formed on the surface of the recessed groove of the guide member.

10. The electric actuator of claim 1, wherein the guide member is formed from thermoplastic resin filled with fiber reinforcement by injection molding.

* * * * *